United States Patent
Li et al.

(10) Patent No.: US 12,510,595 B2
(45) Date of Patent: Dec. 30, 2025

(54) SCAN CLOCK GATING CONTROLLER AND METHOD FOR PERFORMING STUCK-AT FAULT TEST AMONG MULTIPLE BLOCK CIRCUITS

(71) Applicant: Realtek Semiconductor Corp., HsinChu (TW)

(72) Inventors: Dong-Zhen Li, HsinChu (TW); Ying-Yen Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/635,036

(22) Filed: Apr. 15, 2024

(65) Prior Publication Data
US 2024/0353489 A1 Oct. 24, 2024

(30) Foreign Application Priority Data
Apr. 18, 2023 (TW) ................. 112114370

(51) Int. Cl.
  *G01R 31/3185* (2006.01)
  *G01R 31/317* (2006.01)
(52) U.S. Cl.
  CPC ........... *G01R 31/318552* (2013.01); *G01R 31/31726* (2013.01)
(58) Field of Classification Search
  None
  See application file for complete search history.

(56) References Cited

U.S. PATENT DOCUMENTS

| | | | |
|---|---|---|---|
| 2005/0055615 A1* | 3/2005 | Agashe | G01R 31/318552 714/727 |
| 2011/0276849 A1 | 11/2011 | Periasamy | |
| 2024/0094291 A1* | 3/2024 | Yilmaz | G01R 31/318536 |

FOREIGN PATENT DOCUMENTS

KR 20090047786 A * 5/2009

* cited by examiner

*Primary Examiner* — Guerrier Merant
(74) *Attorney, Agent, or Firm* — Winston Hsu (57) ABSTRACT

A scan clock gating controller and a method for performing a stuck-at fault test among multiple block circuits are provided. The scan clock gating controller includes a decoder and multiple clock gating circuits. The decoder is configured to generate multiple one-hot control signals according to a selection signal. The multiple clock gating circuits are configured to generate multiple final scan clocks to the multiple block circuits according to the multiple one-hot control signals, a scan enable signal and an initial scan clock. When the scan enable signal has a first logic value, the multiple clock gating circuits enable the multiple final scan clocks, respectively. When the scan enable signal has a second logic value, the multiple clock gating circuits control whether to enable the multiple final scan clocks according to the multiple one-hot control signals, respectively.

12 Claims, 7 Drawing Sheets

SCAN CLOCK GATING CONTROLLER AND METHOD FOR PERFORMING STUCK-AT FAULT TEST AMONG MULTIPLE BLOCK CIRCUITS

BACKGROUND OF THE INVENTION

1. Field of the Invention

The present invention is related to scan tests of digital circuits, and more particularly, to a scan clock gating controller and a method for performing a stuck-at fault test among multiple block circuits.

2. Description of the Prior Art

In digital circuit design, different modules may belong to different power domains. Based on the consideration of reducing circuit areas, a system developer may selectively allow some hold-time violation conditions to exist. When performing a test on a stuck-at fault among any two block circuits within a product, the hold-time violation conditions mentioned above may introduce problems in associated tests, however. For example, as a number of pins of a physical chip is limited, the chip typically only has one pin for receiving an external scan clock in order to perform a scan test inside the chip. Under this condition, if this scan clock is directly transmitted to any two block circuits within the chip, a test of an asynchronous interface between these two block circuits may fail due to a hold-time violation rule. Thus, the related art needs to stop testing faults between the two block circuits, resulting in a loss to final test coverage.

Thus, there is a need for a novel method and an associated control circuit, in order to solve the problem of tests among multiple block circuits under a condition where a number of scan clocks is limited.

SUMMARY OF THE INVENTION

An objective of the present invention is to provide a scan clock gating controller and a method for performing a stuck-at fault test among multiple block circuits, which can solve the problem of the related art without introducing any side effect or in a way that is less likely to introduce side effects.

At least one embodiment of the present invention provides a scan clock gating controller for performing a stuck-at fault test among multiple block circuits. The scan clock gating controller comprises a decoder and multiple clock gating circuits, wherein the decoder is configured to generate multiple one-hot control signals according to a selection signal, and the multiple clock gating circuits are configured to generate multiple final scan clocks according to the multiple one-hot control signals, a scan enable signal and an initial scan clock. More particularly, the multiple final scan clocks are transmitted to the multiple block circuits, respectively. In addition, when the scan enable signal has a first logic value, the multiple clock gating circuits enable the multiple final scan clocks, respectively. When the scan enable signal has a second logic value, the multiple clock gating circuits control whether to enable the multiple final scan clocks according to the multiple one-hot control signals, respectively.

At least one embodiment of the present invention provides a method for performing a stuck-at fault test among multiple block circuits. The method comprises: utilizing a decoder of a scan clock gating controller to generate multiple one-hot control signals according to a selection signal; and utilizing multiple clock gating circuits of the scan clock gating controller to generate multiple final scan clocks according to the multiple one-hot control signals, a scan enable signal and an initial scan clock, wherein the multiple final scan clocks are transmitted to the multiple block circuits, respectively. In addition, when the scan enable signal has a first logic value, the multiple clock gating circuits enable the multiple final scan clocks, respectively. When the scan enable signal has a second logic value, the multiple clock gating circuits control whether to enable the multiple final scan clocks according to the multiple one-hot control signals, respectively.

The scan clock gating controller and the method provided by the embodiments of the present invention generate multiple final scan clocks respectively for multiple block circuits according to a selection signal and an initial scan clock received externally, where only one block circuits of the multiple block circuits has enabled final scan clocks during a capture phase, and the final scan clocks of the remaining block circuits are disabled. Thus, the present invention can prevent scan clocks of the multiple block circuits from being switched at a same time during the capture phase, to thereby solve the problem in the related art caused by the hold-time violation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
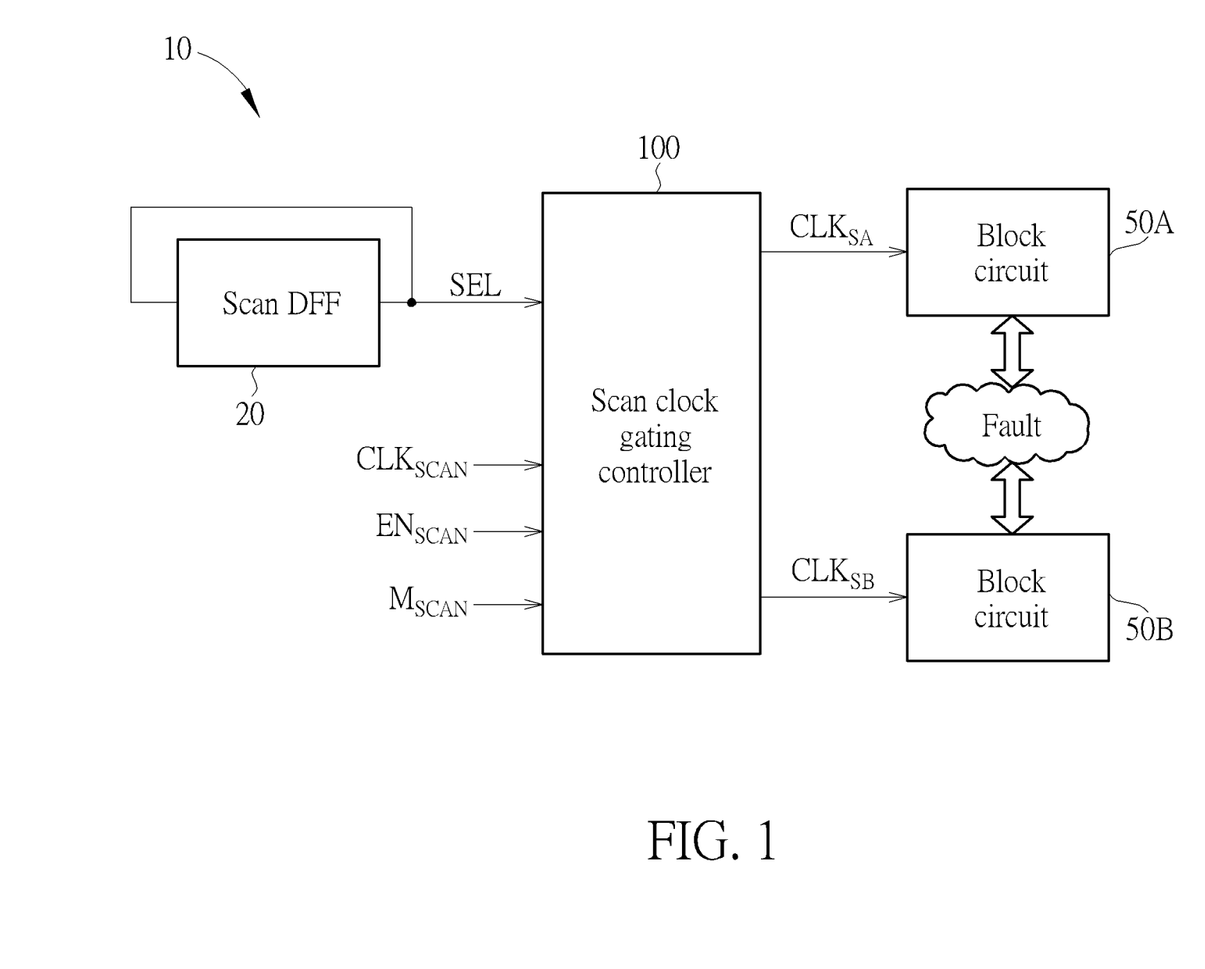
FIG. 1 is a diagram illustrating a device under test according to an embodiment of the present invention.

FIG. 1 is a diagram illustrating a device under test such as an electronic device 10 under test according to an embodiment of the present invention. As shown in FIG. 1, the electronic device 10 may comprise a scan D-type flip-flop (DFF) 20, block circuits 50A and 50B, and a scan clock gating controller 100. In this embodiment, the electronic device 10 may receive a scan clock $CLK_{SCAN}$, a scan enable signal $EN_{SCAN}$, a mode control signal $M_{SCAN}$ and associated test data (e.g. input data transmitted to at least one scan DFF chain within the electronic device 10, where each scan DFF chain of the at least one scan DFF chain may comprise multiple scan DFFs connected in series) externally (e.g. from an automatic test pattern generation (ATPG) system connected to the electronic device 10), in order to test an asynchronous interface between the circuit blocks 50A and 50B, and more particularly, to perform a stuck-at fault test among the block circuits 50A and 50B.

In this embodiment, the scan clock gating controller 100 may generate scan clocks $CLK_{SA}$ and $CLK_{SB}$ according to the scan clock $CLK_{SCAN}$, the scan enable signal $EN_{SCAN}$, the mode control signal $M_{SCAN}$ and a selection signal SEL, where the selection signal SEL may be from the scan DFF 20, and the scan DFF 20 may be a scan DFF within a scan DFF chain of the electronic device 10. In addition, the scan clock $CLK_{SA}$ and $CLK_{SB}$ may be transmitted to the block circuits 50A and 50B, respectively. By converting one scan clock such as $CLK_{SCAN}$ into two scan clocks such as $CLK_{SA}$ and $CLK_{SB}$, the present invention can properly perform the stuck-at fault test among the block circuits 50A and 50B without a test failure due to hold-time violation in a design process.

Figure 2:
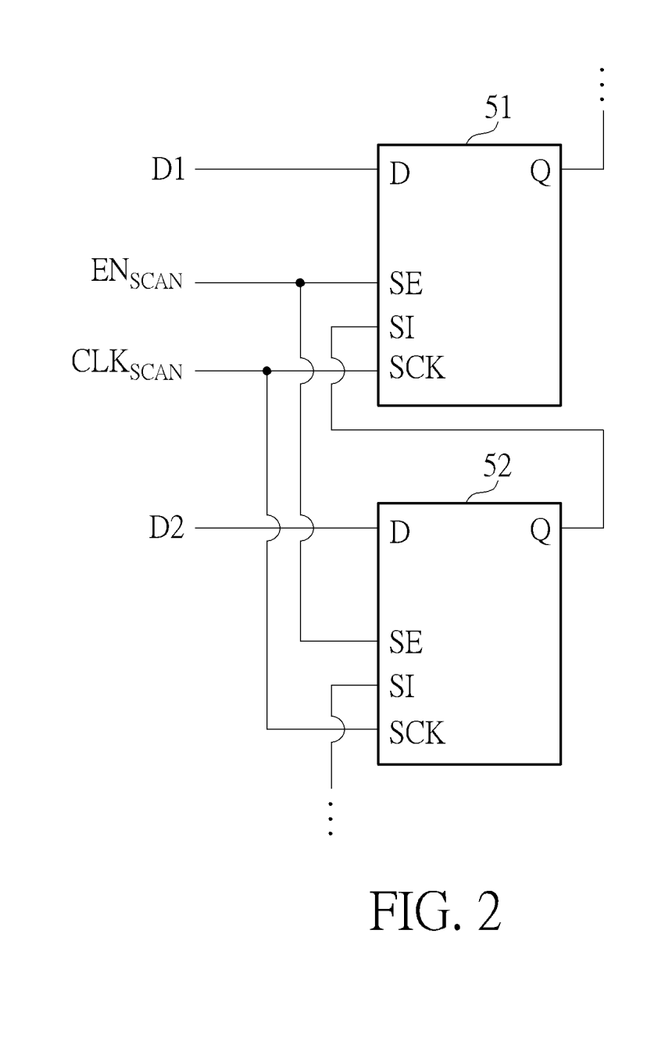
FIG. 2 is a diagram illustrating multiple scan D-type flip-flops connected in series according to an embodiment of the present invention.

FIG. 2 is a diagram illustrating multiple scan DFFs connected in series, such as scan DFFs 51 and 52, according to an embodiment of the present invention, where the DFFs 51 and 52 connected in series shown in FIG. 2 may be an example of any scan DFF chain within the electronic device 10. As shown in FIG. 2, each of the scan DFFs 51 and 52 may comprise a data input pin D, a scan enable pin SE, a scan input pin SI, a scan clock pin SCK and a data output pin Q, where the scan input pin SI of the scan DFF 51 is coupled to the data output pin Q of the scan DFF 52, and a scan DFF coupled to the data output pin Q of the scan DFF 51 or a scan DFF coupled to the scan input pin SI of the scan DFF 52 may be deduced by analogy. In addition, the data input pin D of the scan DFF 51 may be coupled to a data output pin Q of a certain scan DFF of another scan DFF chain to receive data D1, and the data input pin D of the scan DFF 52 may be coupled to a data output pin Q of a certain scan DFF of another scan DFF chain to receive data D2. In addition, the scan enable pin SE and the scan clock pin SCK of each of the scan DFFs 51 and 52 may receive the scan enable signal $EN_{SCAN}$ and the scan clock $CLK_{SCAN}$, respectively. It should be noted that when a scan DFF chain within the block circuit 50A is implemented by the architecture shown in FIG. 2, the scan clock pins SCK of the scan DFFs 51 and 52 within the block circuit 50A receive the scan clock $CLK_{SA}$; and when a scan DFF chain within the block circuit 50B is implemented by the architecture shown in FIG. 2, the scan clock pins SCK of the scan DFFs 51 and 52 within the block circuit 50B receive the scan clock $CLK_{SB}$.

A test (e.g. the stuck-at fault test) performed by a scan DFF chain may comprise a scan phase and a capture phase, where when the scan enable signal $EN_{SCAN}$ has a logic value "1", it means the test is in the scan phase, and when the scan enable signal $EN_{SCAN}$ has a logic value "0", it means the test is in the capture phase. In detail, when the test is in the scan phase, the scan DFF 51 may output the data received by the scan input pin SI of the scan DFF 51 (i.e. the data output from the data output pin Q of the scan DFF 52) to the data output pin Q of the scan DFF 51 based on timing of the scan clock $CLK_{SCAN}$, and the scan DFF 52 may output the data received by the scan input pin SI of the scan DFF 52 to the data output pin Q of the scan DFF 52 based on the timing of the scan clock $CLK_{SCAN}$. When the test is in the capture phase, the scan DFF 51 may output the data D1 received by the data input pin D of the scan DFF 51 to the data output pin Q of the scan DFF 51 based on the timing of the scan clock $CLK_{SCAN}$, and the scan DFF 52 may output the data D2 received by the data input pin D of the scan DFF 52 to the data output pin Q of the scan DFF 52 based on the timing of the scan clock $CLK_{SCAN}$.

Figure 3:
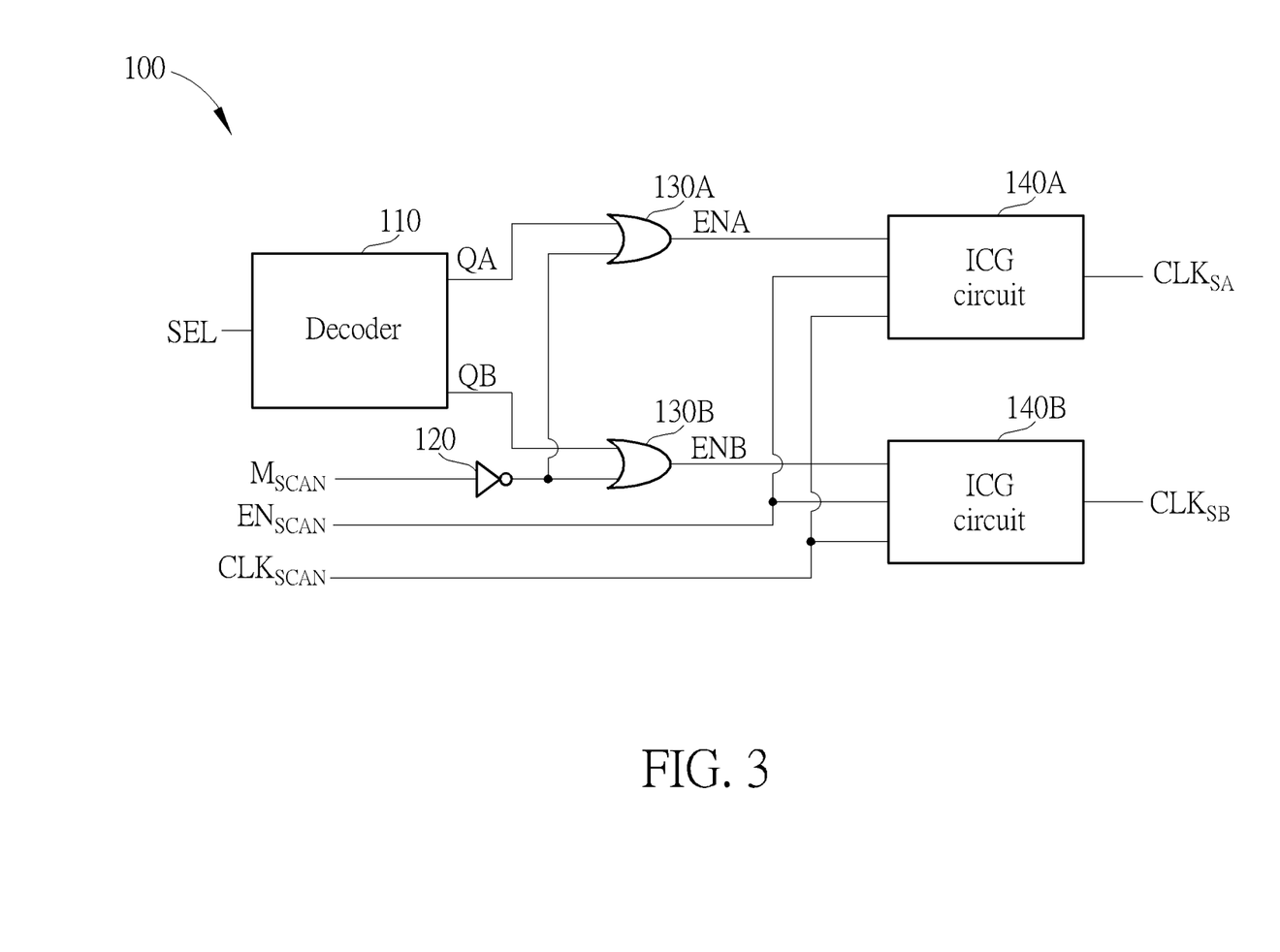
FIG. 3 is a diagram illustrating a scan clock gating controller according to an embodiment of the present invention.

FIG. 3 is a diagram illustrating the scan clock gating controller 100 according to an embodiment of the present invention. As shown in FIG. 3, the scan clock gating controller 100 may comprise a decoder 110 and multiple clock gating circuits such as integrated clock gating (ICG) circuits 140A and 140B. The decoder 110 is configured to generate multiple one-hot control signals such as QA and QB according to the selection signal SEL, and the ICG circuits 140A and 140B are configured to generate multiple final scan clocks such as the scan clocks $CLK_{SA}$ and $CLK_{SB}$ according to the one-hot control signals QA and QB, the scan enable signal $EN_{SCAN}$ and an initial scan clock such as the scan clock $CLK_{SCAN}$, where the multiple final scan clocks are transmitted to the multiple block circuits, respectively. In particular, the ICG circuit 140A may generate the scan clock $CLK_{SA}$ according to the one-hot control signal QA, the scan enable signal $EN_{SCAN}$ and the scan clock $CLK_{SCAN}$, and the ICG circuit 140B may generate the scan clock $CLK_{SB}$ according to the one-hot control signal QB, the scan enable signal $EN_{SCAN}$ and the scan clock $CLK_{SCAN}$. When the scan enable signal $EN_{SCAN}$ has the logic value "1", the ICG circuit 140A may enable the scan clock $CLK_{SA}$, and the ICG circuit 140B may enable the scan clock $CLK_{SB}$. When the scan enable signal $EN_{SCAN}$ has the logic value "0", the ICG circuit 140A may control whether to enable the scan clock $CLK_{SA}$ according to the one-hot control signal QA, and the ICG circuit 140B may control whether to enable the scan clock $CLK_{SB}$ according to the one-hot control signal QB.

In this embodiment, the scan clock gating controller 100 may further comprise an inverter 120 and multiple OR logic gates such as OR logic gates 130A and 130B, where the OR logic gate 130A is coupled to the ICG circuit 140A, the decoder 110 and the inverter 120, and the OR logic gate 130B is coupled to the ICG circuit 140B, the decoder 110 and the inverter 120. The inverter 120 is configured to generate an inverted signal of the mode control signal $M_{SCAN}$. The OR logic gate 130A is configured to perform an OR operation on the one-hot control signal QA and the inverted signal of the mode control signal $M_{SCAN}$, to generate a one-hot enable signal ENA. The OR logic gate 130B is configured to perform an OR operation on the one-hot control signal QB and the inverted signal of the mode control signal $M_{SCAN}$, to generate a one-hot enable signal ENB. The ICG circuit 140A may receive the one-hot enable signal ENA, in order to generate the scan clock $CLK_{SA}$ according to the one-hot enable signal ENA, the scan enable signal $EN_{SCAN}$ and the scan clock $CLK_{SCAN}$. The ICG circuit 140B may receive the one-hot enable signal ENB, in order to generate the scan clock $CLK_{SB}$ according to the one-hot enable signal ENB, the scan enable signal $EN_{SCAN}$ and the scan clock $CLK_{SCAN}$.

In detail, whether a one-hot control function of the scan clock gating controller 100 is activated or not is controlled by the mode control signal $M_{SCAN}$. In this embodiment, only one of the one-hot control signals QA and QB has the logic value "1", and the other has the logic value "0". When the mode control signal $M_{SCAN}$ has the logic value "1" (which means the one-hot control function of the scan clock gating controller 100 is activated), the inverted signal of the mode control signal $M_{SCAN}$ (i.e. the signal output from the inverter 120) has the logic value "0", making logic values of the one-hot enable signals ENA and ENB respectively equal to logic values of the one-hot control signals QA and QB. Thus, only one of the one-hot enable signals ENA and ENB has the logic value "1", and the other has the logic value "0". Assume that when the selection signal SEL has the logic value "0", the one-hot control signal QA has the logic value "1" and the one-hot control signal QB has the logic value "0", where the scan clock $CLK_{SA}$ may be taken as a selected scan clock at this moment. Thus, the ICG circuit 140A may enable the scan clock $CLK_{SA}$ during the capture phase (i.e. a period of the scan enable signal $EN_{SCAN}$ having the logic value "0"), and the ICG circuit 140B may disable the scan clock $CLK_{SB}$ during the capture phase (i.e. the period of the scan enable signal $EN_{SCAN}$ having the logic value "0"). When the selection signal SEL has the logic value "1", the one-hot control signal QA has the logic value "0" and the one-hot control signal QB has the logic value "1", where the scan clock $CLK_{SB}$ may be taken as a selected scan clock at this moment. Thus, the ICG circuit 140B may enable the scan clock $CLK_{SB}$ during the capture phase (i.e. a period of the scan enable signal $EN_{SCAN}$ having the logic value "0"), and the ICG circuit 140A may disable the scan clock $CLK_{SA}$ during the capture phase (i.e. the period of the scan enable signal $EN_{SCAN}$ having the logic value "0").

When the mode control signal $M_{SCAN}$ has the logic value "0" (which means the one-hot control function of the scan clock gating controller 100 is inactivated), the inverted signal of the mode control signal $M_{SCAN}$ (i.e. the signal output from the inverter 120) has the logic value "1", making the logic values of the one-hot enable signals ENA and ENN both equal to the logic value "1". Thus, both the scan clocks $CLK_{SA}$ and $CLK_{SB}$ may be enabled during the capture phase (e.g. a period of the scan enable signal $EN_{SCAN}$ having the logic value "0").

Figure 4:
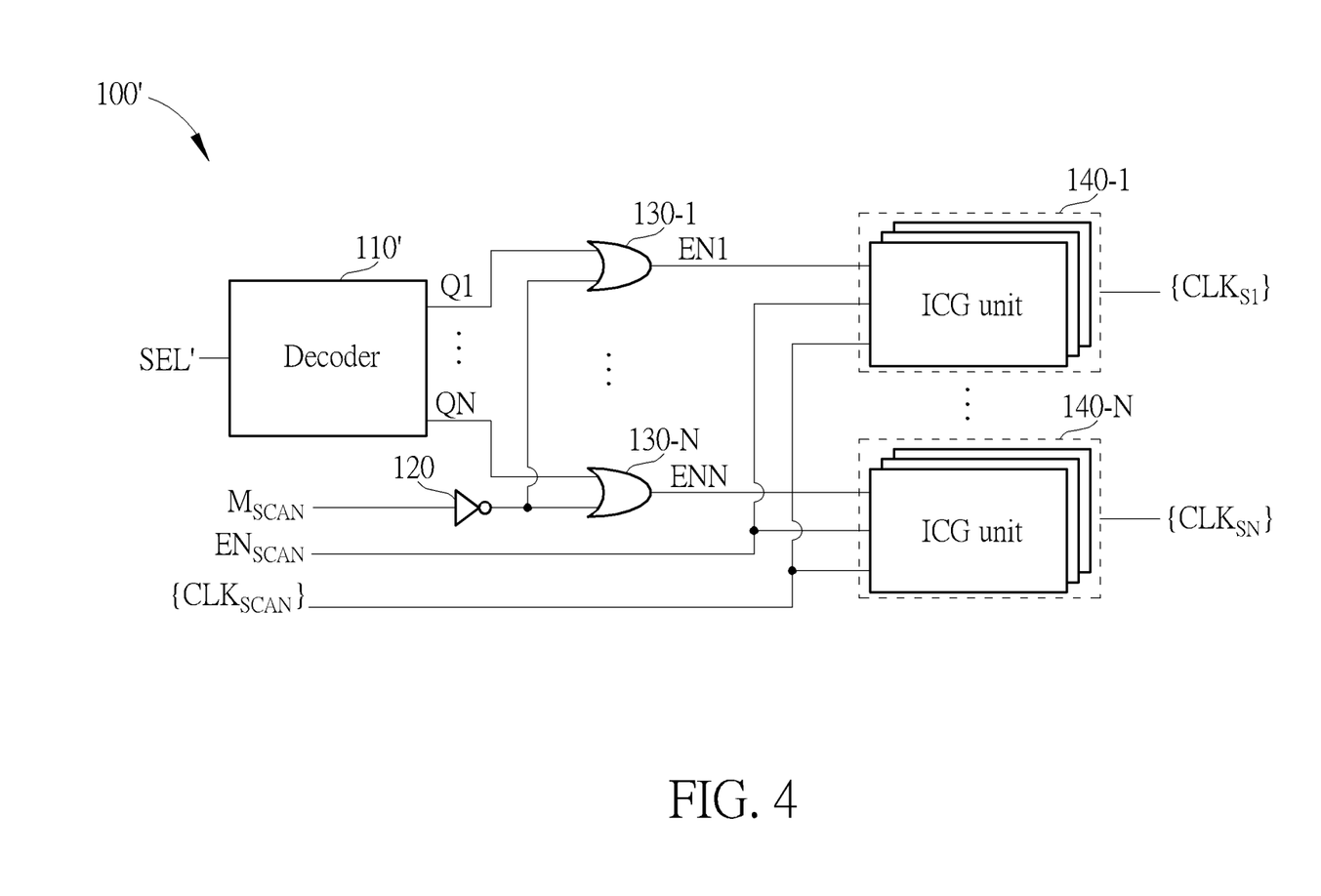
FIG. 4 is a diagram illustrating a scan clock gating controller according to another embodiment of the present invention.

It should be noted that the embodiments of FIG. 1 and FIG. 3 are illustrated with the stuck-at fault test among two block circuits, but the present invention is not limited thereto. FIG. 4 is a diagram illustrating a scan clock gating controller 100' according to another embodiment of the present invention, where the scan clock gating controller 100' may convert one initial scan clock such as the scan clock $CLK_{SCAN}$ into multiple final scan clocks such as scan clocks $CLK_{S1}$, . . . and $CLK_{SN}$ according to a selection signal SEL', the mode control signal $M_{SCAN}$ and the scan enable signal $EN_{SCAN}$, where the scan clocks $CLK_{S1}$, . . . and $CLK_{SN}$ are transmitted to N block circuits, respectively, and N is a positive integer. In this embodiment, the decoder 110' may generate N one-hot control signals such as Q1, . . . and QN according to the selection signal SEL', where a logic value of a selected one-hot control signal of the one-hot control signals Q1, . . . and QN is different from a logic value of each of remaining one-hot control signals of the one-hot control signals Q1, . . . and QN. For example, when the selection signal SEL' has a first value, the one-hot control signal Q1 has the logic value "1", and the remaining one-hot control signal has the logic value "0". When the selection signal SEL' has a second value, the one-hot control signal Q2 has the logic value "1", and the remaining one-hot control signal has the logic value "0". Deduced by analogy, when the selection signal SEL' has a $N^{th}$ value, the one-hot control signal QN has the logic value "1", and the remaining one-hot control signal has the logic value "0". In addition, the scan clock gating controller 100' may comprise N OR logic gates such as 130-1, . . . and 130-N, which are respectively configured to receive the one-hot control signals Q1, . . . and QN and accordingly generate one-hot enable signals EN1, . . . and ENN. In addition, the scan clock gating controller 100' may comprise N ICG circuits 140-1, 140-2, . . . and 140-N, where the ICG circuits 140-1, 140-2, . . . and 140-N may receive the one-hot enable signals EN1, . . . and ENN, and accordingly generate the scan clocks $CLK_{S1}$, . . . and $CLK_{SN}$. In addition, each of the ICG circuits 140-1, 140-2, . . . and 140-N, such as an ICG circuit 140-n (where n may represent a positive integer within an interval [1, N]), may comprise multiple clock gating sub-circuits (e.g. multiple ICG units) such as K ICG units, in order to receive multiple initial scan sub-clocks (e.g. multiple scan clocks $\{CLK_{SCAN}\}$) such as K scan clocks $\{CLK_{SCAN}(1), \ldots, CLK_{SCAN}(K)\}$ (e.g. K is a positive integer), respectively, and the K ICG units may accordingly generate multiple final scan clocks $\{CLK_{Sn}\}$ such as K final scan clocks $\{CLK_{Sn}(1), \ldots, CLK_{Sn}(K)\}$, respectively, where a $k^{th}$ ICG unit (where k may represent an integer within an interval [1, K]) of the multiple ICG units of the ICG circuit 140-n may receive a $k^{th}$ scan clock $CLK_{SCAN}(k)$ of the multiple scan clocks $\{CLK_{SCAN}\}$ and generate a $k^{th}$ final scan clock $CLK_{Sn}(k)$ of the multiple final scan clocks $\{CLK_{Sn}\}$ according to the scan clock $CLK_{SCAN}(k)$. For example, multiple ICG units within the ICG circuit 140-1 may generate multiple scan clocks $\{CLK_{S1}\}$ according to the multiple scan clocks $\{CLK_{SCAN}\}$. Deduced by analogy, multiple ICG units within the ICG circuit 140-N may generate multiple scan clocks $\{CLK_{SN}\}$ according to the multiple scan clocks $\{CLK_{SCAN}\}$.

Those skilled in this art should understand other details of the scan clock gating controller 100' according to the descriptions of the embodiment of FIG. 3 and the architecture shown in FIG. 4; related details will be omitted here for brevity.

Figure 5:
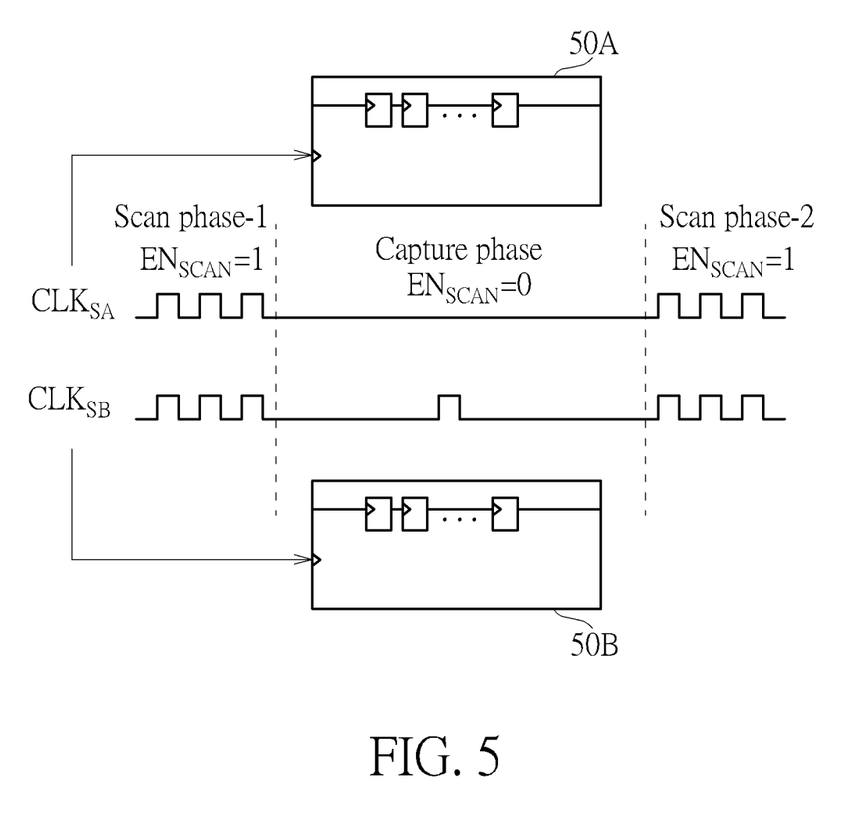
FIG. 5 is a diagram illustrating multiple scan clocks respectively provided to multiple block circuits according to an embodiment of the present invention.

FIG. 5 is a diagram illustrating the scan clocks $CLK_{SA}$ and $CLK_{SB}$ respectively provided to the block circuits 50A and 50B according to an embodiment of the present invention. In this embodiment, the selection signal SEL has the logic value "1", and therefore the one-hot control signal QA shown in FIG. 3 has the logic value "0" and the one-hot control signal QB has the logic value "1". During a first time scan phase (labeled "Scan phase-1" in FIG. 5 for better comprehension), the scan enable signal $EN_{SCAN}$ has the logic value "1" (labeled "$EN_{SCAN}$=1" for better comprehension), and the scan clocks $CLK_{SA}$ and $CLK_{SB}$ are both enabled to allow the block circuits 50A and 50B to receive test data and shift the test data through the scan DFF chains therein. During the capture phase (labeled "Capture phase" in FIG. 5 for better comprehension), the scan enable signal $EN_{SCAN}$ has the logic value "0" (labeled "$EN_{SCAN}$=0" for better comprehension), the scan clock $CLK_{SA}$ may be disabled and the scan clock $CLK_{SB}$ may be enabled, in order to make only the block circuit 50B among the block circuits 50A and 50B be able to capture a present state of the scan DFF chain therein (e.g. the data received by the data input pins D of respective scan DFFs). During a second time scan phase (labeled "Scan phase-2" in FIG. 5 for better comprehension), the scan enable signal $EN_{SCAN}$ has the logic value "1" (labeled "$EN_{SCAN}$=1" FIG. 5 for better comprehension), and both the scan clocks $CLK_{SA}$ and $CLK_{SB}$ are enabled, where the block circuit 50B may output the data which is obtained in the capture phase through the scan DFF chain therein.

Figure 6:
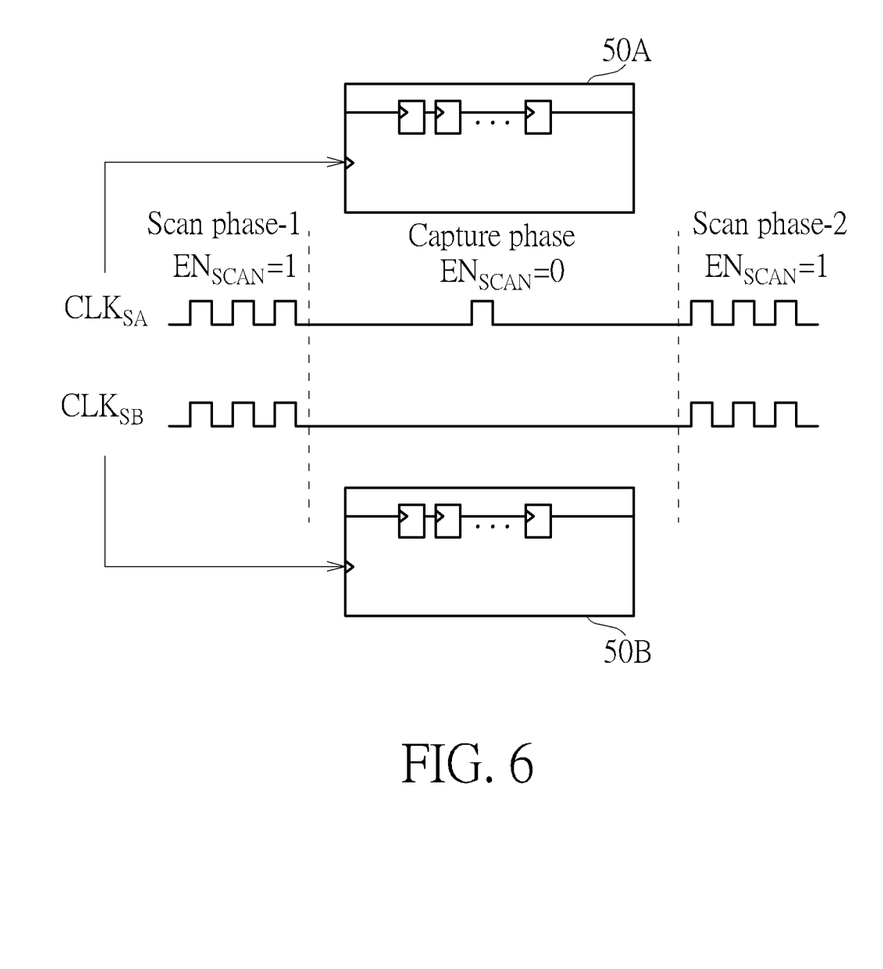
FIG. 6 is a diagram illustrating multiple scan clocks respectively provided to multiple block circuits according to another embodiment of the present invention.

FIG. 6 is a diagram illustrating the scan clocks $CLK_{SA}$ and $CLK_{SB}$ respectively provided to the block circuits 50A and 50B according to another embodiment of the present invention. In this embodiment, the selection signal SEL has the logic value "0", and therefore the one-hot control signal QA shown in FIG. 2 has the logic value "1" and the one-hot control signal QB has the logic value "0". Thus, during the capture phase, the scan clock $CLK_{SA}$ may be enabled and the scan clock $CLK_{SB}$ may be disabled. Those skilled in this art should understand related details of the embodiment shown in FIG. 6 according to the description of the embodiment shown in FIG. 5, and the related details are omitted here for brevity.

Figure 7:
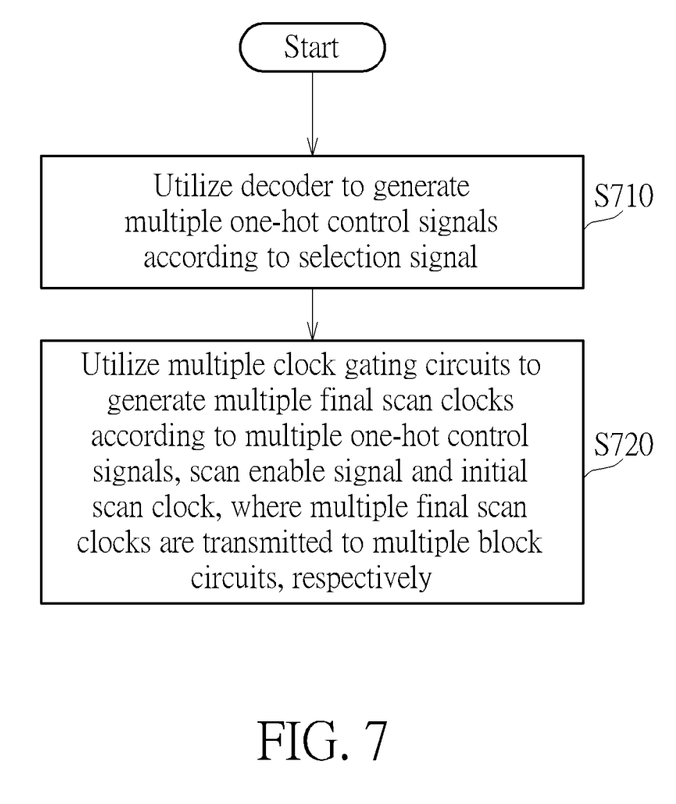
FIG. 7 is a diagram illustrating a working flow of a method for performing a stuck-at fault test among multiple block circuits according to an embodiment of the present invention.

FIG. 7 is a diagram illustrating a working flow of a method for performing a stuck-at fault test among multiple block circuits according to an embodiment of the present invention, where the method may be executed by a scan clock gating controller (e.g. the scan clock gating controller 100 shown in FIG. 3 or the scan clock gating controller 100' shown in FIG. 4). It should be noted that one or more steps may be added, deleted or modified in the working flow shown in FIG. 7. In addition, as long as an overall result is not affected, these steps do not have to be executed in the exact order shown in FIG. 7.

In Step S710, the scan clock gating controller may utilize a decoder therein to generate multiple one-hot control signals according to a selection signal.

In Step S720, the scan clock gating controller may utilize multiple clock gating circuits therein to generate multiple final scan clocks according to the multiple one-hot control signals, a scan enable signal and an initial scan clock, where the multiple final scan clocks are transmitted to the multiple block circuits, respectively. More particularly, when the scan enable signal has a first logic value (e.g. the logic value "1"), all of the multiple final scan clocks are enabled; and when the scan enable signal has a second logic value (e.g. the logic value "0"), whether to enable the multiple final scan clocks are controlled according to the multiple one-hot control signals, respectively.

To summarize, the scan clock gating controller and the method provided by the embodiments of the present invention can convert a single scan clock into multiple scan clocks, and only one scan clock of the multiple scan clocks is enabled during the capture phase. Thus, even if the hold-time violation exists among circuit blocks, stuck-at faults among the circuit blocks can be properly tested by one-hot scan clocks. In addition, the embodiments of the present invention will not greatly increase additional costs. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scan clock gating controller for performing a stuck-at fault test among multiple block circuits, comprising:
    a decoder, configured to generate multiple one-hot control signals according to a selection signal;
    multiple clock gating circuits, configured to generate multiple final scan clocks according to the multiple one-hot control signals, a scan enable signal and an initial scan clock, wherein the multiple final scan clocks are transmitted to the multiple block circuits, respectively;
    an inverter, configured to generate an inverted signal of a mode control signal; and
    multiple OR logic gates, coupled to the multiple clock gating circuits, the decoder and the inverter, configured to perform an OR logic operation on the multiple one-hot control signals and the inverted signal of the mode control signal, to generate multiple one-hot enable signals, respectively;
    wherein the multiple clock gating circuits receive the multiple one-hot enable signals, respectively, and generate the multiple final scan clocks according to the multiple one-hot enable signals, the scan enable signal and the initial scan clock;
    wherein when the scan enable signal has a first logic value, the multiple clock gating circuits enable the multiple final scan clocks, respectively; and when the scan enable signal has a second logic value, the multiple clock gating circuits control whether to enable the multiple final scan clocks according to the multiple one-hot control signals, respectively;
    wherein whether a one-hot control function of the scan clock gating controller is activated or not is controlled by the mode control signal, and when the one-hot control function is inactivated, each of the multiple final scan clocks is enabled during a capture phase of the stuck-at fault test.

2. The scan clock gating controller of claim 1, wherein a period of the scan enable signal having the first logic value corresponds to a scan phase of the stuck-at fault test, and a period of the scan enable signal having the second logic value corresponds to a capture phase of the stuck-at fault test.

3. The scan clock gating controller of claim 2, wherein a selected final scan clock of the multiple final scan clocks is enabled during the capture phase, and each of remaining final scan clocks of the multiple final scan clocks is disabled during the capture phase.

4. The scan clock gating controller of claim 1, wherein a logic value of a selected one-hot control signal of the multiple one-hot control signals is different from a logic value of each of remaining one-hot control signals of the multiple one-hot control signals.

5. The scan clock gating controller of claim 1, wherein when the one-hot control function is activated, a selected final scan clock of the multiple final scan clocks is enabled during a capture phase of the stuck-at fault test, and each of remaining final scan clocks of the multiple final scan clocks is disabled during the capture phase.

6. The scan clock gating controller of claim 1, wherein each of the multiple clock gating circuits comprises multiple clock gating sub-circuits, the initial scan clock comprises multiple initial scan sub-clocks, each of the multiple final scan clocks comprises multiple final scan sub-clocks, and each of the multiple clock gating sub-circuits is configured to generate a specific final scan sub-clock of the multiple final scan sub-clocks according to a selected one-hot control signal of the multiple one-hot control signals, a scan enable signal, and a specific initial scan sub-clock of the multiple initial scan sub-clocks.

7. A method for performing a stuck-at fault test among multiple block circuits, comprising:
    utilizing a decoder of a scan clock gating controller to generate multiple one-hot control signals according to a selection signal;
    utilizing multiple clock gating circuits of the scan clock gating controller to generate multiple final scan clocks according to the multiple one-hot control signals, a scan enable signal and an initial scan clock, wherein the multiple final scan clocks are transmitted to the multiple block circuits, respectively;
    utilizing an inverter of the scan clock gating controller to generate an inverted signal of a mode control signal; and utilizing multiple OR logic gates of the scan clock gating controller to perform an OR logic operation on the multiple one-hot control signals and the inverted signal of the mode control signal, to generate multiple one-hot enable signals, respectively;

wherein the multiple clock gating circuits receive the multiple one-hot enable signals, respectively, and generate the multiple final scan clocks according to the multiple one-hot enable signals, the scan enable signal and the initial scan clock;

wherein when the scan enable signal has a first logic value, the multiple clock gating circuits enable the multiple final scan clocks, respectively; and when the scan enable signal has a second logic value, the multiple clock gating circuits control whether to enable the multiple final scan clocks according to the multiple one-hot control signals, respectively;

wherein whether a one-hot control function of the scan clock gating controller is activated or not is controlled by the mode control signal, and the method further comprises:

in response to the one-hot control function being inactivated, enabling each of the multiple final scan clocks during a capture phase of the stack-at fault test.

8. The method of claim 7, wherein a period of the scan enable signal having the first logic value corresponds to a scan phase of the stuck-at fault test, and a period of the scan enable signal having the second logic value corresponds to a capture phase of the stuck-at fault test.

9. The method of claim 8, wherein a selected final scan clock of the multiple final scan clocks is enabled during the capture phase, and each of remaining final scan clocks of the multiple final scan clocks is disabled during the capture phase.

10. The method of claim 7, wherein a logic value of a selected one-hot control signal of the multiple one-hot control signals is different from a logic value of each of remaining one-hot control signals of the multiple one-hot control signals.

11. The method of claim 7, further comprising:
in response to the one-hot control function being activated, enabling a selected final scan clock of the multiple final scan clocks during a capture phase of the stuck-at fault test, and disabling each of remaining final scan clocks of the multiple final scan clocks during the capture phase.

12. The method of claim 7, wherein each of the multiple clock gating circuits comprises multiple clock gating sub-circuits, the initial scan clock comprises multiple initial scan sub-clocks, each of the multiple final scan clocks comprises multiple final scan sub-clocks, and each of the multiple clock gating sub-circuits is configured to generate a specific final scan sub-clock of the multiple final scan sub-clocks according to a selected one-hot control signal of the multiple one-hot control signals, a scan enable signal, and a specific initial scan sub-clock of the multiple initial scan sub-clocks.

* * * * *